US012719120B2

(12) United States Patent
Moon et al.

(10) Patent No.: US 12,719,120 B2
(45) Date of Patent: Aug. 25, 2026

(54) POUCH-TYPE SECONDARY BATTERY, MANUFACTURING METHOD THEREOF, AND POUCH-TYPE SECONDARY BATTERY MANUFACTURED THEREFROM

(71) Applicant: SK INNOVATION CO., LTD., Seoul (KR)

(72) Inventors: Gi Hyeon Moon, Daejeon (KR); Jong Hyuk Lee, Daejeon (KR)

(73) Assignee: SK On Co., Ltd., Seoul (KR)

(*) Notice: Subject to any disclaimer, the term of this patent is extended or adjusted under 35 U.S.C. 154(b) by 10 days.

(21) Appl. No.: 17/584,032

(22) Filed: Jan. 25, 2022

(65) Prior Publication Data

US 2022/0238949 A1 Jul. 28, 2022

(30) Foreign Application Priority Data

Jan. 25, 2021 (KR) ........................ 10-2021-0010123

(51) Int. Cl.

| | |
|---|---|
| ***H01M 50/195*** | (2021.01) |
| ***H01M 50/105*** | (2021.01) |
| ***H01M 50/186*** | (2021.01) |
| ***H01M 50/197*** | (2021.01) |
| ***H01M 50/198*** | (2021.01) |

(52) U.S. Cl.
CPC ....... *H01M 50/195* (2021.01); *H01M 50/105* (2021.01); *H01M 50/186* (2021.01); *H01M 50/197* (2021.01); *H01M 50/198* (2021.01)

(58) Field of Classification Search
None
See application file for complete search history.

(56) References Cited

U.S. PATENT DOCUMENTS

| | | | | |
|---|---|---|---|---|
| 2012/0021261 A1* | 1/2012 | Kim | ...................... | H01M 10/02 429/53 |
| 2015/0367294 A1* | 12/2015 | Kharul | ................. | B01D 69/107 521/55 |
| 2020/0306698 A1* | 10/2020 | Stark | .................... | B01D 69/148 |

FOREIGN PATENT DOCUMENTS

| | | |
|---|---|---|
| KR | 10-0611682 B1 | 8/2006 |
| KR | 10-2013-0012665 A | 2/2013 |
| KR | 10-2017-0043926 A | 4/2017 |
| KR | 10-2018-0059630 A | 6/2018 |

(Continued)

OTHER PUBLICATIONS

Machine Translation of Ji (Year: 2019).*

(Continued)

*Primary Examiner* — Matthew T Martin
*Assistant Examiner* — Ankith R Sripathi
(74) *Attorney, Agent, or Firm* — IP & T GROUP LLP

(57) ABSTRACT

Provided are a pouch-type secondary battery, a manufacturing method thereof, and a pouch-type secondary battery manufactured therefrom. More particularly, a pouch-type secondary battery having an electrode assembly built therein wherein the pouch has an opening and one surface or both surfaces of the opening are sealed by a gas separation membrane including a porous substrate and a composite layer including a polymer, in which silver particles or a silver salt is dispersed, laminated on one surface or both surfaces of the porous substrate, a manufacturing method thereof, and a pouch-type secondary battery manufactured therefrom are provided.

4 Claims, 2 Drawing Sheets

(56) References Cited

FOREIGN PATENT DOCUMENTS

| | | | | | |
|---|---|---|---|---|---|
| KR | 10-2019-0042215 A | | 4/2019 | | |
| KR | 20190042215 A | * | 4/2019 | .......... | H01M 50/116 |

OTHER PUBLICATIONS

Ingo Pinnau, "Solid polymer electrolyte composite membranes for olefin/paraffin separation", Oct. 2, 2020, Journal of Membrane Science (Year: 2000).*

Minsu Kim, Sang Wook Kang, Comparison of Functional Groups in Polymer/Ag Nanoparticles/Electron Acceptor Composite Membranes for Olefin/Paraffin Separation, National Research Foundation of Korea (Year: 2018).*

Pinnau "Solid polymer electrolyte composite membranes for olefin/paraffin separation", Elsevier, Journal of Membrane Science 184 (Year: 2001).*

Kim, M., Kang, S.W. PEBAX-1657/Ag nanoparticles/7,7,8,8-tetracyanoquinodimethane complex for highly permeable composite membranes with long-term stability. Sci Rep 9, 4266 (2019). https://doi.org/10.1038/s41598-019-40185-6 (Year: 2019).*

Zachary D. Dozun et al., Why Silver Nanoparticles Are Effective for Olefin/Paraffin Separations, The Journal of Physical Chemistry C, 2011, p. 1811-1818, ACS Publications.

Office Action for Korean Patent Application No. 10-2021-0010123 issued by the Korean Patent Office on Nov. 25, 2025.

* cited by examiner

[FIG. 1]
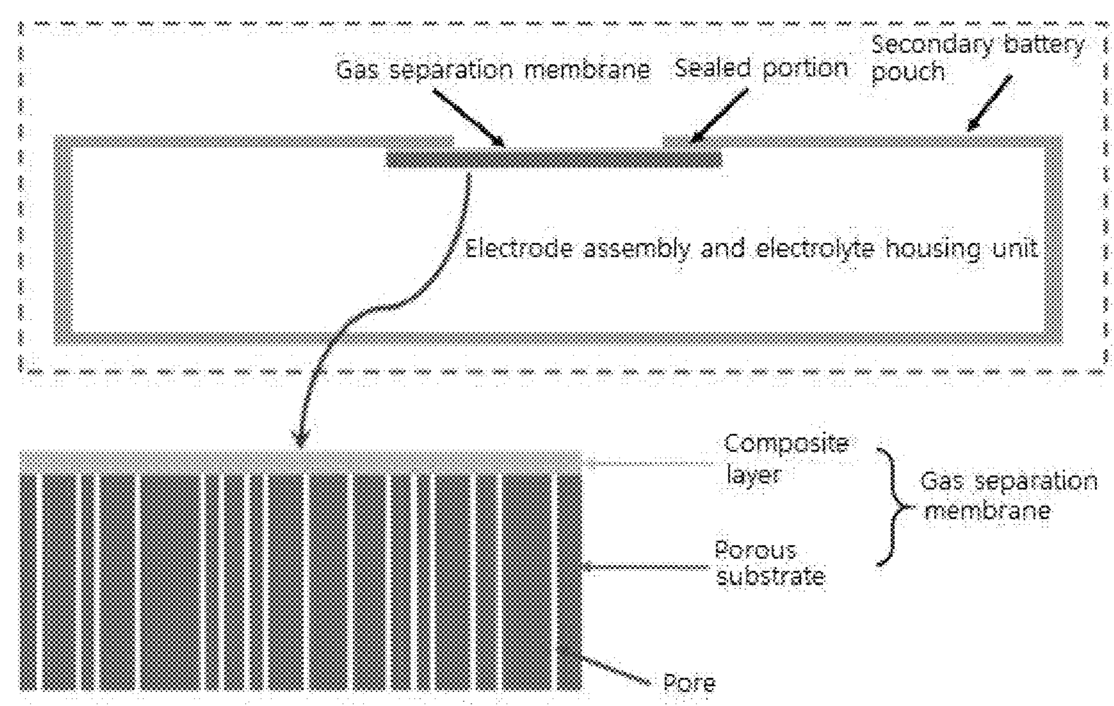
[FIG. 2]
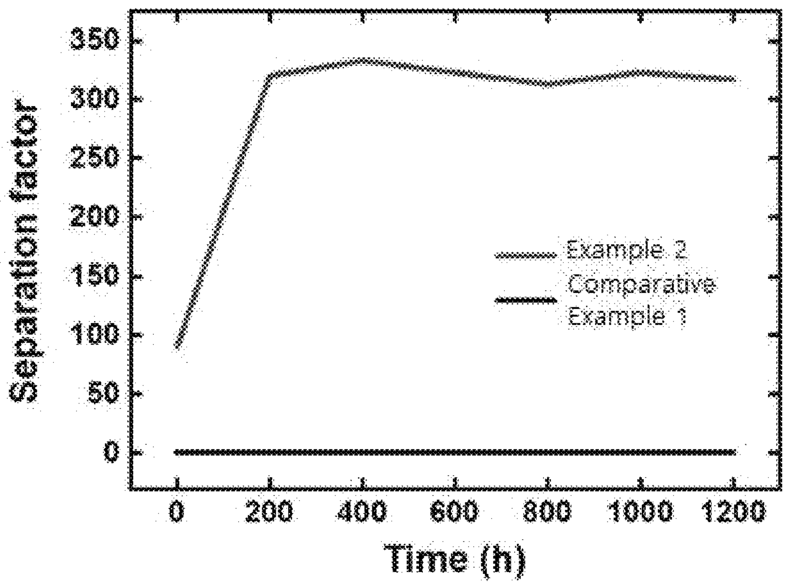

[FIG. 3]
Permeance (GPU)
30
25
20
15
10
5
0
0 200 400 600 800 1000 1200
Time (h)
Example 2
Comparative Example 1
[FIG. 4]
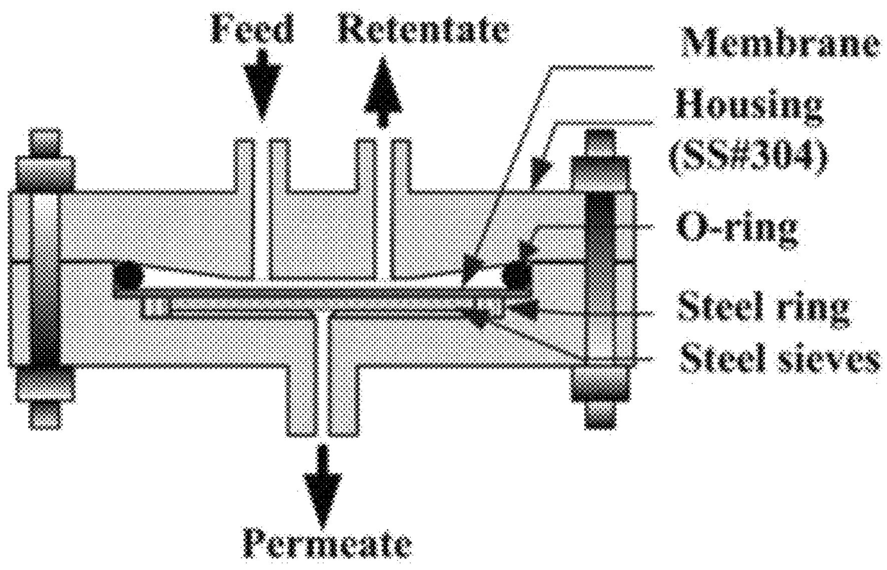

POUCH-TYPE SECONDARY BATTERY, MANUFACTURING METHOD THEREOF, AND POUCH-TYPE SECONDARY BATTERY MANUFACTURED THEREFROM

CROSS-REFERENCE TO RELATED APPLICATIONS

This application claims priority under 35 U.S.C. § 119 to Korean patent application no. 10-2021-0010123, filed on Jan. 25, 2021, in the Korean intellectual property office, the disclosure of which is incorporated herein by reference in its entirety.

TECHNICAL FIELD

The following disclosure relates to a pouch-type secondary battery, a manufacturing method thereof, and a pouch-type secondary battery manufactured therefrom.

BACKGROUND

A secondary battery which is recently widely used may be classified into a cylindrical battery, a rectangular battery, a pouch-type battery, and the like. Among them, a pouch-type battery which may be laminated with a high degree of integration, has a high energy density per weight, is inexpensive, and is easily deformed, is attracting a lot of attention.

The pouch-type battery cell refers to a battery cell having a battery case composed of a laminate sheet, and has a structure having an electrode assembly built inside the battery case.

Generally, one of the main research projects of a pouch-type battery having a flexible shell is to improve safety. In the case of a lithium secondary battery, the internal pressure of a battery is increased above a certain level even during a manufacturing process, due to gas produced from an aging process of storing the battery for a certain period of time at a temperature and humidity set for a formation process, a repeated charge and discharge process, and the like, or a large amount of gas produced in the process of using the battery, whereby a sealed part is detached, the pouch becomes swollen and vented in a sealed portion, or a malfunction of a battery cell or explosion of a battery may be caused by deformation of the pouch.

In order to solve the problem, conventionally, a technology of installing a valve having a gas discharge function in an outer packaging material (pouch) of a battery was disclosed, but the weight per unit volume was increased, so that the weight became heavy and an energy density was decreased. In addition, during the manufacturing process of a battery, an olefin gas such as ethylene and propylene produced in a large amount from a formation process may not be selectively discharged, an electrolyte solution may leak out, or stability to an electrolyte solution may be deteriorated.

Therefore, development of a new pouch-type secondary battery which may selectively remove a large amount of olefin gas such as ethylene or propylene produced in an initial formation process of a lithium secondary battery, is not permeable to gas such as moisture and oxygen from outside, and has excellent stability to an electrolyte solution while not leaking the electrolyte solution, is demanded.

RELATED ART DOCUMENTS

Patent Documents

Korean Patent Laid-Open Publication No. 10-2013-0012665 (Feb. 5, 2013)

SUMMARY

An embodiment of the present invention is directed to selectively discharge an olefin gas such as ethylene and propylene produced in an initial formation process and the use of a battery, thereby solving problems of separation or venting of a sealed portion and deformation of a secondary battery pouch, maintaining the function of a battery cell, and securing a user's safety.

More specifically, an embodiment of the present invention is directed to providing a pouch-type secondary battery which may continuously discharge an olefin gas such as ethylene and propylene produced inside the battery and block the permeation of oxygen, non-moisture gas, and the like from the outside to the inside of a battery pouch, and a manufacturing method thereof. Another embodiment of the present invention is directed to providing a secondary battery including a pouch which suppresses leakage of an electrolyte solution inside the pouch and has high stability to an electrolyte solution, the secondary battery having a lighter weight as compared with a conventional pouch-type secondary battery and increasing a packing density so that a high output and a large capacity are easy to obtain.

Still another embodiment of the present invention is directed to providing a secondary battery pouch having a gas separation membrane sealed on one surface or both surfaces of an opening formed by removing a part of the secondary battery pouch, the gas separation membrane being formed by laminating a composite layer including a polymer, in which silver particles or a silver salt is dispersed, on one surface or both surfaces of a porous support layer, the secondary battery pouch selectively/continuously discharging an olefin gas and blocking moisture and oxygen from the outside, being stable even to an electrolyte solution, and being applied to provide a pouch-type secondary battery having improved life time and operation stability.

In one general aspect, a pouch-type secondary battery having an electrode assembly housed inside a pouch is provided, wherein the pouch has one or two or more openings, one side surface or both side surfaces of the opening are sealed by a gas separation membrane, and the gas separation membrane includes a porous substrate and a composite layer, in which silver-based particles are dispersed, formed on one surface or both surfaces of the porous substrate.

In the pouch-type secondary battery according to an exemplary embodiment of the present invention, the composite layer comprises at least one selected from the group consisting of polyimide-based, polyvinylidene fluoride-based, polyvinylalcohol-based, polystyrene-based, polyamide-based, polyvinylpyrrolidone-based, polyethyleneoxide-based, polyoxazoline-based polymers, a polymer electrolyte and a copolymer thereof.

In the pouch-type secondary battery according to an exemplary embodiment of the present invention, the composite layer may have a thickness of 1 to 10 μm.

In the pouch-type secondary battery according to an exemplary embodiment of the present invention, the porous substrate may have a thickness of 10 to 200 μm.

In the pouch-type secondary battery according to an exemplary embodiment of the present invention, the composite layer may be formed on the surface of the porous substrate.

In the pouch-type secondary battery according to an exemplary embodiment of the present invention, the composite layer may be formed on the surface of the porous substrate and formed by being impregnated in the pores of the porous substrate.

In another general aspect, a manufacturing method of the pouch-type secondary battery described above is provided.

The manufacturing method of a pouch-type secondary battery includes: forming one or two or more openings on the surface of a pouch; sealing one side surface or both side surfaces of the opening with a gas separation membrane having a composite layer formed in which silver-based particles are dispersed; and housing an electrode assembly inside the pouch.

In the manufacturing method of a pouch-type secondary battery according to an exemplary embodiment of the present invention, before the forming of the opening, a step of forming a housing unit which houses the electrode assembly is further included.

In the manufacturing method of a pouch-type secondary battery according to an exemplary embodiment of the present invention, in the gas separation membrane having the composite layer formed, the composite layer may be formed by coating a composite composition in which silver-based particles are dispersed on one surface or both surfaces of the porous substrate and drying the composition.

In the manufacturing method of a pouch-type secondary battery according to an exemplary embodiment of the present invention, before the coating and drying, a step of immersing the porous substrate in the composite composition may be further included. In still another general aspect, a pouch-type secondary battery manufactured by the manufacturing method of a pouch-type secondary battery described above is provided.

The pouch-type secondary battery includes an electrode assembly housed inside a secondary battery pouch which has an opening formed by removing a part of a secondary battery pouch and a gas separation membrane sealed on one side surface or both side surfaces of the opening, wherein the gas separation membrane has a lamination structure by forming a composite layer including a polymer, in which silver particles or a silver salt is dispersed, on one surface or both surfaces of a porous support layer.

The gas separation membrane having the composite layer formed of the present invention is formed on one side surface or both side surfaces of the opening of the pouch to seal the pouch so that the inside of the pouch is blocked from the outside, whereby an improved effect of blocking external moisture and oxygen is shown, and, in particular, an olefin gas such as ethylene and propylene produced during a formation process of a battery and operation of a battery is selectively/continuously discharged to the outside, thereby preventing a problem in that when a secondary battery pouch is deformed and the gas separation membrane in a sealed portion is separated or the pouch is swollen and then vented in a sealed portion at the time of an internal pressure rise, gas inside the pouch is discharged, and the lifetime, operation, and use stability of a battery are improved.

Furthermore, dangers such as an explosion by reduced function or poor stability of a battery cell inside due to the deformation of the battery are blocked, thereby further improving a user's stability.

In addition, the gas separation membrane, which is placed by being directly sealed on one side surface or both side surfaces of the opening of the pouch-type secondary battery of the present invention, is not dissolved in an electrolyte solution and has an excellent electrolyte solution blocking effect to prevent the escape (leakage) of the electrolyte solution, and has excellent mechanical strength to further improve the durability of the battery.

Furthermore, since the pouch-type secondary battery according to the present invention is formed by sealing the gas separation membrane of a thin film on the surface of the opening of the pouch, the thickness, size, and weight of the secondary battery pouch are not increased overall, so that an excellent packing density may be implemented as compared with the same volume, thereby implementing a battery which may be reduced in weight even with a high capacity.

BRIEF DESCRIPTION OF THE DRAWINGS

FIG. 1 is a schematic diagram of a pouch-type secondary battery according to an exemplary embodiment of the present invention.

FIG. 2 is a graph showing a separator factor for ethylene/ethane mixed gas of secondary battery pouches manufactured in Example 2 and Comparative Example 1 of the present invention.

FIG. 3 is a graph showing gas discharge performance of the secondary battery pouches manufactured in Example 2 and Comparative Example 1 of the present invention.

FIG. 4 is a schematic diagram of a gas permeation cell used in the present invention.

DETAILED DESCRIPTION OF EMBODIMENTS

The terms used in the present invention have the same meanings as those commonly understood by a person skilled in the art. In addition, the terms used herein are only for effectively describing a certain specific example, and are not intended to limit the present invention.

The singular form used in the specification of the present invention and the claims appended thereto may be intended to also include a plural form, unless otherwise indicated in the context.

Throughout the present specification describing the present invention, unless explicitly described to the contrary, "comprising" any elements will be understood to imply further inclusion of other elements rather than the exclusion of any other elements.

The inventors of the present invention studied extensively to solve the above problems, and as a result, found a pouch-type secondary battery which may selectively and continuously discharge an olefin gas such as ethylene and propylene, has excellent performance of blocking external oxygen and moisture, and has excellent stability to an electrolyte solution to implement an excellent battery life and operation stability, by sealing one side surface or both side surfaces of an opening formed in a pouch and housing an electrode assembly in the inside of the pouch, with a gas separation membrane having a structure in which a composite layer formed by including any one or more silver-based materials selected from silver particles or silver salts and a high molecular polymer is laminated on a porous support layer, thereby completing the present invention.

The pouch-type secondary battery according to an exemplary embodiment of the present invention is appropriate for implementation of a small thickness, may have a reduced weight, and may easily implement a battery having a high capacity for the same volume. In addition, an olefin gas produced during the formation process and operation of a battery may be continuously discharged, the deformation of the outer surface of the pouch such as venting in the sealed portion is suppressed, thereby improving the stability and long-term durability of a battery.

Furthermore, the pouch-type secondary battery according to an exemplary embodiment of the present invention has excellent mechanical durability and excellent stability to an electrolyte solution to further improve the stability of a battery, thereby securing a user's safety from accidents such as explosion.

Hereinafter, each constituent element of the present invention will be described in more detail with reference to drawings. However, these are only illustrative and the present invention is not limited to the specific embodiments which are illustratively described by the present invention.

The pouch-type secondary battery according to an exemplary embodiment of the present invention is formed by sealing one side surface or both side surfaces of an opening formed by removing a part of the pouch with a gas separation membrane, and the gas separation membrane is formed by including a porous support layer and a composite layer formed by a high molecular polymer including silver particles or a silver salt dispersed therein, laminated on one surface or both surfaces of the porous support layer. Here, the gas separation membrane may seal the opening in the form of covering the opening.

The secondary battery pouch according to an exemplary embodiment of the present invention has selectively excellent permeability to an olefin gas such as ethylene and propylene, may continuously discharge the olefin gas from the inside of the pouch to the outside without accumulation of the gas, has excellent performance of blocking penetration of external oxygen, carbon dioxide, nitrogen, moisture, and the like, and has excellent stability to an electrolyte solution, thereby implementing an excellent battery life, operation stability, and use safety.

In addition, a secondary battery which has an increased packing density of a cell module which is a laminate of the pouch-type battery cell relative to the same volume of a secondary battery due to excellent durability and a lighter weight and is capable of having a higher capacity and a lighter weight may be manufactured, and it may be more preferred for application to an electric device, an electric vehicle, or the like which requires a high capacity.

Hereinafter, the pouch-type secondary battery according to an exemplary embodiment of the present invention will be described in detail. The pouch-type secondary battery according to an exemplary embodiment of the present invention is a pouch-type secondary battery having an electrode assembly housed inside a pouch, wherein the pouch has one or two or more openings, one side surface or both side surfaces of the opening are sealed by a gas separation membrane, and the gas separation membrane includes a porous substrate and a composite layer, in which silver-based particles are dispersed, formed on one surface or both surfaces of the porous substrate.

The pouch has an opening formed by removing a part of the pouch, and the shape of the opening is not limited as long as a structure in which the inside and the outside of the secondary battery pouch are connected is formed, but as an example, the opening may be spherical, tetragonal, triangular, or polygonal, or may be in the form in which several shapes are listed.

The material of the pouch is not limited as long as it is used as a known outer packaging material of a battery, but a specific example may be those formed by being selected from multilayer films of a metal (or metal foil), a metal layer (or metal foil), and a synthetic resin layer covered thereon, and the like, or may be molded in the form of having a housing unit which houses an electrode assembly and an electrolyte solution inside.

The pouch may be provided with a housing unit which houses an electrode assembly inside, and the electrode assembly housed therein is not limited as long as it is a known electrode assembly and, specifically, may be selected from the group consisting of a jelly roll-type electrode assembly having a structure of being wound after a separator is interposed between a long sheet-shaped positive electrode and a negative electrode, a stack-type electrode assembly composed of a unit cell having a structure in which rectangular positive electrode and a negative electrode are laminated with a separator interposed therebetween, a stack-folding-type electrode assembly in which the unit cell is wound by a long separation film, a lamination-stack-type electrode assembly in which the unit cell is laminated with a separator interposed and attached therebetween, and the like, but is not limited thereto. The gas separation membrane serves to continuously discharge an olefin gas such as ethylene, propylene, and butylene produced in the inside of a secondary battery pouch and block the inflow of gas such as oxygen, nitrogen, carbon dioxide, and moisture from the outside into the inside of the secondary battery pouch, is insoluble in an electrolyte solution inside the secondary battery pouch, and has a function of not leaking the electrolyte solution to the outside.

More specifically, the gas separation membrane may be sealed on one side surface or both side surfaces of the opening of the secondary battery pouch, in which the gas separation membrane may be placed and sealed on the opening surface outside the pouch, placed and sealed on the inner surface of the pouch having the electrode assembly placed therein, or placed on both surfaces of the opening inside or outside the pouch, but the present invention is not limited thereto. Here, the gas separation membrane covers the opening and is sealed so that the inside and outside of the pouch-type secondary battery are blocked.

The gas separation membrane may be in the form in which a composite layer including silver-based particles is laminated on one surface of both surfaces of the porous substrate, and the silver-based particles may be any one or more selected from silver particles or silver salts.

The porous substrate is in the form of a film, a sheet, and the like having pores in the inside having permeability, and though the size of pores is not limited, it may be 1 nm to 500 nm, for example, but the size of pores is not limited as long as the substrate has a function of penetrating and discharging an olefin gas such as ethylene or propylene may be selectively as desired in the present invention.

The porous substrate may have a thickness of 1 to 300 μm, specifically 10 μm to 200 μm, and more specifically 10 μm to 100 μm.

The material forming the porous substrate is not limited as long as it has excellent mechanical properties and is insoluble in an electrolyte solution, but as an example, may be formed of any one selected from polysulfone, polyethersulfone, polycarbonate, polyethyleneoxide, polyimide, polyetherimide, polyetheretherketone, polypropylene, polymethylpentene, polymethyl chloride, polyvinylidene fluoride, and the like or a mixture thereof, without limitation. Preferably, a porous substrate formed of polysulfone may be used, since the mechanical durability and the stability to an electrolyte solution of the pouch to be manufactured are further improved.

The composite layer including a polymer, in which silver particles or a silver salt is dispersed, may include a first embodiment in which the composite layer is formed on the surface of the porous substrate and a second embodiment in which the composite layer is impregnated and formed in the surface of the porous substrate and the inside of the pores of the porous substrate.

In the first embodiment, the composite layer may have a thickness of 100 nm to 50 μm, specifically 0.1 μm to 20 μm, and more specifically 1 μm to 10 μm, but is not limited thereto, in the sense of achieving the object of the present invention.

In the second embodiment, the composite layer impregnated in the pores of the porous substrate may be formed by being coated only on the surface of the pores of the porous substrate or immersed all in the pores so that the inside of pores is closed by the composite layer. Here, the thickness of the composite layer formed on the surface of the porous substrate may be 100 nm to 50 μm, specifically 0.1 μm to 20 μm, and more specifically 1 μm to 10 μm.

In the second embodiment, the surface area of the composite layer formed is increased, and the permeability of the olefin gas such as ethylene and propylene may be further improved, which is thus more preferred.

The polymer forming the composite layer including a polymer, in which any one or more silver materials selected from silver particles or silver salts are dispersed, comprises at least one selected from the group consisting of polyimide-based, polyvinylidene fluoride-based, polyvinylalcohol-based, polystyrene-based, polyamide-based, polyvinylpyrrolidone-based, polyethyleneoxide-based, polyoxazoline-based polymers, a polymer electrolyte and a copolymer thereof, but is not limited thereto.

The polymer electrolyte is not limited as long as it is a polymer electrolyte commonly used in batteries. Specifically, it may be polyethylene oxide (PEO), polyacrylo nitrile (PAN), polyvinylidene fluoride (PVdF), polymethyl metacrylate (PMMA), polyethylene_carbonate (PEC) or polypropylene carbonate (PPC), but is not limited thereto.

The silver particles may be, specifically, silver nanoparticles, and the size of the particles is not limited, but, specifically, 0.1 to 100 nm.

Hereinafter, the manufacturing method of a pouch-type secondary battery according to an exemplary embodiment of the present invention will be described in detail.

The manufacturing method of a pouch-type secondary battery according to an exemplary embodiment of the present invention may include: forming one or two or more openings on the surface of a pouch; sealing one side surface or both side surfaces of the opening with a gas separation membrane having a composite layer formed in which silver-based particles are dispersed; and housing an electrode assembly inside the pouch.

In the forming of one or two or more openings on the surface of a pouch, the pouch may be the same as described above, and the opening refers to one having a structure in which the inside and the outside of the pouch are connected to each other by removing a part of the pouch. Here, the inside of the pouch refers to a part in which an electrode assembly and an electrolyte solution are housed, and the outside of the pouch refers to a part on which the outer surface of the pouch is placed.

Though the method of forming the opening is not limited, an example thereof may be a method of perforating using a perforating device such as a punching machine, a cutting method using a cutting device such as laser or cutter, and the like, and the cut shape may be polygonal, linear, grid type, and the like, but is not limited thereto.

Before the forming of the openings as described above, a step of forming a housing unit which houses an electrode assembly may be further included, and the method of forming the housing unit is not limited as long as it is a known method.

In the sealing of the opening with a gas separation membrane, the gas separation membrane may be formed by a composite layer in which silver-based particles are dispersed, and as a preferred exemplary embodiment, may be manufactured by coating a composite composition in which silver-based particles are dispersed on one surface or both surfaces of a porous substrate and drying the composition to form the composite layer.

The composite composition may include a silver salt or silver particles, a polymer, and a solvent.

The silver salt may be used without limitation as long as it has a silver salt form including a silver ion ($Ag^+$), and specifically, may be any one or two or more selected from $AgNO_3$, $AgBF_4$, $AgCF_3SO_3$, $AgClO_4$, $AgPF_6$, $Ag_2CO_3$, and the like.

The polymer may be those as described above, and the solvent is not limited as long as it is a solvent which may dissolve the silver salt and the polymer and as a non-limiting example, may be water, methanol, ethanol, isopropanol, buthanol, methylcellosolve, and the like. These may be used alone or in combination of two or more.

The contents of the silver salt and the polymer in the composite composition may be at a mole ratio of 1:0.2 to 1:1.2, preferably 1:0.9 to 1:1.1 of the silver salt with respect to the repeating unit of the polymer. The composite composition is mixed at a temperature of room temperature to 60° C. for 12 to 36 hours to further improve dispersibility of a silver ion.

The dispersion solvent of the composite composition is not particularly limited when a composite layer including silver nanoparticles is to be formed, and various dispersion solvents such as ester-based, ether-based, alcohol-based, ketone-based, and hydrocarbon-based solvents may be used, and preferably ethanol which may reduce a solver salt may be used and an electron acceptor may be further included.

The electron acceptor may be any one or more selected from tetracyanoquinodimethane (TCNQ), p-benzoquinone (p-BQ), dinitrobenzene (DNB), dinitrotoluene (DNT), and the like, and by further including the electron acceptor, the electron acceptor is placed in the silver nanoparticles formed by effectively reducing the silver salt or on the surface of the silver nanoparticles, so that the selective permeability of an olefin gas is further increased, which is thus preferred. When the electron acceptor is further included, it is preferred to sufficiently perform mixing. In the mixing, for example, a process of mixing at a temperature of 60° C. or higher for 1 hour or more, preferably 5 hours or more, for example, 5 hours to 48 hours may be further included.

The gas separation membrane in which the composite layer is formed may be formed by coating the composite composition on one surface or both surfaces of the porous substrate and drying the composition, and the porous substrate may be the same material as the porous substrate.

A method of coating the composite composition on the porous substrate is not limited, but various methods such as bar coating, dip coating, die coating, gravure coating, comma coating, slit coating, or a mixed method thereof may be used.

Here, in order to implement the second embodiment of the composite layer described above, the composite composition is first immersed after preparing a dilute composition obtained by diluting the composite composition 5 to 100 times and before coating the composite composition on the surface, and then dried to coat the composite composition on the surface of the porous substrate. It may be properly implemented by adjusting an immersion time and the concentration of the dilute composition to form the composite layer only on the surface of the internal pores of the porous substrate or form the entire internal pores into the composite layer.

The gas separation membrane may be manufactured by coating the composite composition on the surface of the porous substrate and then drying the composition.

The drying may further include a step of drying at room temperature under normal pressure for 1 to 24 hours and then further drying at room temperature under vacuum for 1 to 24 hours, but is not limited thereto. Thereafter, a step of combining the manufactured gas separation membrane with one surface or both surfaces of the opening of a secondary battery pouch is included, thereby manufacturing the secondary battery pouch.

The gas separation membrane is in the form of covering the opening and may be combined with one side surface or both side surfaces of the opening, and more specifically, the combining may be sealing by junction with an opening outer periphery of the opening inside the secondary battery pouch in which the electrode assembly is housed, an outer periphery of the opening outside the secondary battery pouch, or a secondary battery pouch part of all of the opening outer periphery inside and outside the secondary battery pouch. The combining is not limited, but may be performed using a method selected from ultrasonic wave welding, thermal bonding, an adhesive, or the like.

Thereafter, the electrode assembly described above is inserted into the housing unit inside the pouch in which the gas separation membrane described above is sealed on one side surface or both side surfaces of the opening, and then the pouch is completely sealed, thereby manufacturing the pouch-type secondary battery according to an exemplary embodiment of the present invention. Here, the electrolyte solution may be injected together, but the present invention is not limited thereto.

Here, as a method of completely sealing the pouch after the electrode assembly is inserted, a known technology may be used without limitation, of course.

Hereinafter, the present invention will be described in more detail with reference to the Examples and Comparative Examples. However, the following Examples and Comparative Examples are only an example for describing the present invention in more detail, and do not limit the present invention in any way.

Hereinafter, the physical properties were measured as follows:

1) Gas Permeability, Selectivity, and Discharge Persistence

The manufactured gas separation membrane was bound to the gas permeation cell as shown in FIG. 4, and then an ethylene/ethane mixed gas in which ethylene and ethane were mixed at a volume ratio of 50:50 at room temperature was flowed into a feed unit. In order to maintain the fraction of gas entering the gas permeation cell constant, a pressure regulator was connected to the feed unit, a mass flow controller (MFC) was connected to a retentate unit to control a flow rate to be constant at 50 cc/min at a relative pressure of 0.5 atm, and a mass flow meter (MFM) was installed in a permeation unit to measure the flow rate of the mixed gas permeated in real time, thereby expressing a gas permeability as in a gas permeation unit (GPU) unit [1 GPU=$1\times10^{-6}$ $cm^3$ (STP)/$cm^2$·cmHg·sec].

In addition, a part of the mixed gas passing through the mass flow meter (MFM) was collected to measure a volume fraction of the mixed gas by gas chromatography. The measured volume fraction was used to calculate a gas selectivity by a separation factor represented by the following equation:

$$\text{Separation factor} = \frac{v_{ethylene,out}/v_{ethane,out}}{v_{ethylene,in}/v_{ethane,in}},$$

$$v = \text{volume fraction of corresponding gas}$$

2) Stability to Electrolyte Solution

An electrolyte solution made by mixing a $LiPF_6$ salt with a solvent of EC/EMC/DMC=1/1/1 (w/w/w) to have a concentration of 1 M was injected into the secondary battery pouches manufactured in Examples 1 and 2 and Comparative Example 1. Thereafter, sealing was performed, the battery pouch was allowed to stand at 30° C. for 100 hours in a state in which the electrolyte solution is in contact with one surface of the gas separation membrane, and then the gas separation membrane was detached to measure a changed weight per unit area. Thereafter, a gas permeability change before/after contact with the electrolyte solution was measured by measuring the mixed gas permeability of the detached gas separation membrane.

[Preparation Example 1] Polymer Solution 0.5 g of polyvinylpyrrolidone (PVP) and 20 g of water were stirred at room temperature for 24 hours to prepare a composition for forming a composite layer (A).

[Preparation Example 2] Silver Salt/Polymer Solution 0.5 g of polyvinylpyrrolidone (PVP), 0.9 g of $AgBF_4$ (silver tetrafluoroborate), and 20 g of water were stirred at room temperature for 24 hours to prepare a composition for forming a composite layer (B).

[Preparation Example 3] Silver Nanoparticles/Polymer Solution 0.5 g of polyvinylpyrrolidone (PVP), 0.9 g of $AgBF_4$ (silver tetrafluoroborate), and 20 g of ethanol were stirred at 60° C. for hours to form silver nanoparticles, 0.01 g of tetracyanoquinodimethane (TCNQ) was added thereto, and mixing was performed at 60° C. for 12 hours to prepare a composition for forming a composite layer (C).

Example 1

The composition for forming a composite layer (B) prepared in Preparation Example 2 was bar-coated at a thickness of 3 μm on one surface of a polysulfone separator for Uf-grade water treatment having an average pore size of 20 nm and a thickness of 100 μm, dried at room temperature under normal temperature for 6 hours, and further dried at room temperature under vacuum for 12 hours to manufacture a gas separation membrane.

Thereafter, the surface of the secondary battery pouch was perforated using a punching machine having a diameter of 16 mm to form an opening, the manufactured gas separation membrane was placed in the opening inside the pouch in which an electrode assembly was housed, and an outer peripheral surface on which the gas separation membrane and the secondary battery pouch overlap was thermally bonded to manufacture a pouch.

Example 2

A pouch was manufactured in the same manner as in Example 1, except that the composition for forming a composite layer (C) prepared in Preparation Example 3 was used.

Comparative Example 1

A pouch was manufactured in the same manner as in Example 1, except that the composition for forming a composite layer (A) prepared in Preparation Example 1 was used.

The olefin gas selectivity permeability, discharge persistence, and stability to an electrolyte solution of the pouches for a secondary battery manufactured in Examples 1 and 2 and Comparative Example 1 were measured, and are shown in the following Table 1. In addition, the separation factor for the ethylene/ethane mixed gas of the pouches manufactured in Example 2 and the pouch manufactured in Comparative Example 1 was measured over time, the values are shown in FIG. 2, and the discharge performance over time is shown in FIG. 3.

TABLE 1

| | | | Discharge persistence | | Stability to electrolyte solution | |
|---|---|---|---|---|---|---|
| | Gas permeability (GPU) | Gas selectivity | Gas permeability (GPU) after 1,000 hours | Gas selectivity after 1,000 hours | Weight change per unit area after 100 hours | Gas permeability change after 100 hours |
| Example 1 | 3 | 140 | 2 | 5 | No change | No change |
| Example 2 | 13 | 330 | 14 | 310 | No change | No change |
| Comparative Example 1 | 0.1 | 1 | 0.1 | 1 | No change | No change |

As shown in Table 1, it was confirmed that the pouches manufactured in Examples 1 and 2 had excellent gas permeability, excellent gas selectivity, and excellent discharge persistence even after 1,000 hours. In particular, in Example 2, it was confirmed that the gas permeability and the gas selectivity were significantly improved by 130 times and 330 times, respectively as compared with Comparative Example 1, and changes in the gas permeability and the gas selectivity after 1,000 hours were extremely small.

In addition, both in Examples 1 and 2, long-term stability for an electrolyte solution was confirmed.

As in FIGS. 2 and 3, in Example 2, it was confirmed that the gas selectivity over time was improved as compared with Comparative Example 1 and a high level was maintained, and in the case of the gas permeability, it was confirmed that the permeation rate over time was maintained constant at about 15 GPU as compared with Comparative Example 1 in which gas hardly permeated.

That is, the pouch-type secondary battery according to the present invention has an electrode assembly housed in the pouch manufactured by sealing the gas separation membrane having a composite layer formed, in which silver-based particles are dispersed, on one side surface or both side surfaces of the opening, thereby implementing a secondary battery which may prevent inflow of external gas such as oxygen and moisture into the inside, selectively, continuously, and uniformly discharge an olefin gas such as ethylene produced inside the secondary battery to the outside for a long time, have excellent stability to an electrolyte solution, suppress performance deterioration of the secondary battery even in the operation for a long time, and secure long-term operation stability.

Therefore, the spirit of the present invention should not be limited to the above-described exemplary embodiments, and the following claims as well as all modified equally or equivalently to the claims are intended to fall within the scope and spirit of the invention.

What is claimed is:

1. A pouch-type secondary battery having an electrode assembly housed inside a pouch, wherein the pouch has one or two or more openings, wherein one side surface or both side surfaces of the opening is sealed by a gas separation membrane using thermal bonding, wherein the gas separation membrane includes a porous substrate and a composite layer formed on one surface or both surfaces of the porous substrate, wherein the composite layer comprises a silver salt and tetracyanoquinodimethane (TCNQ) dispersed in a polymer, and wherein one side surface or both side surfaces of the opening is sealed by the gas separation membrane such that the composite layer faces the opening.

2. The pouch-type secondary battery of claim 1, wherein the composite layer comprises at least one selected from the group consisting of polyimide-based, polyvinylidene fluoride-based, polyvinylalcohol-based, polystyrene-based, polyamide-based, polyvinylpyrrolidone-based, polyethyleneoxide-based, polyoxazoline-based polymers, a polymer electrolyte and a copolymer thereof.

3. The pouch-type secondary battery of claim 1, wherein the composite layer has a thickness of 1 to 10 μm.

4. The pouch-type secondary battery of claim 1, wherein the porous substrate has a thickness of 10 to 200 μm.

* * * * *